P. J. DARLINGTON.
APPARATUS FOR STRAINING OR FILTERING LIQUIDS.
APPLICATION FILED MAR. 26, 1919.

1,337,756.

Patented Apr. 20, 1920.
10 SHEETS—SHEET 1.

Fig. 1

INVENTOR
Philip J. Darlington

INVENTOR
Philip J Darlington

P. J. DARLINGTON.
APPARATUS FOR STRAINING OR FILTERING LIQUIDS.
APPLICATION FILED MAR. 26, 1919.

1,337,756.

Patented Apr. 20, 1920.
10 SHEETS—SHEET 5.

Fig. 7.

INVENTOR
Philip J Darlington

P. J. DARLINGTON.
APPARATUS FOR STRAINING OR FILTERING LIQUIDS.
APPLICATION FILED MAR. 26, 1919.

1,337,756.

Patented Apr. 20, 1920.
10 SHEETS—SHEET 7.

INVENTOR
Philip J. Darlington

UNITED STATES PATENT OFFICE.

PHILIP J. DARLINGTON, OF HARTFORD, CONNECTICUT.

APPARATUS FOR STRAINING OR FILTERING LIQUIDS.

1,337,756.      Specification of Letters Patent.     Patented Apr. 20, 1920.

Application filed March 26, 1919. Serial No. 285,155.

*To all whom it may concern:*

Be it known that I, PHILIP J. DARLINGTON, a citizen of the United States, residing at Hartford, in the county of Hartford and State of Connecticut, have invented a new and useful Improvement in Apparatus for Straining or Filtering Liquids, of which the following is a specification.

This invention relates to apparatus which is designed for separating, by straining or filtering, undesirable matter from liquids, for instance, cinders, twigs, leaves, and the like solid matter from natural sources of water supply, solid foreign matter from fuel and lubricating oils and similar fluids, and oil and other oleaginous impurities from water, which apparatus is constructed so that it may be in constant use, that is, may be cleaned and repaired when necessary or desirable without interfering with its use or obstructing its normal operation.

The object of the invention is to provide an apparatus of this class which can be built cheaply, with an ordinary manufacturing equipment; that is simple, strong, durable and reliable and can be quickly and safely operated, adjusted, cleaned and repaired by unskilled workmen; that is capable in its standard form of being used under a wide range of conditions, as to location, pressure or suction, nature of liquid to be treated, and impurities or foreign matter to be removed; that can be adapted to extreme conditions of size, installation and service with but slight change and low cost; and that offers but slight resistance to the normal flow of the liquid being treated, and will require but infrequent cleaning.

In the accompanying drawings a twin strainer, that is, one in which there are two sets of valves and strainer baskets, is illustrated.

The main body 2 of the casing of the apparatus first illustrated comprises a pair of vertically arranged cylinders 3 and 4 containing filter chambers 5 and 6, and on opposite sides intermediate the cylinders the vertically arranged triangular valve box 7 containing the inlet valve chamber 8 and valve box 9 containing the outlet valve chamber 10. The boss 11 on the outer face of the valve box 7 contains the horizontal inlet passage 13 and is provided with a flange 15 for attachment to one end of the pipe line, and the boss 12 on the outer face of the valve box 9 contains the horizontal discharge passage 14 and is provided with a flange 16 for attachment to the other end of the pipe line on which the apparatus is used. A hub 19 joins the right cylinder 3 with one of the inner faces of the valve box 7, and a hub 20 joins the left cylinder 4 with the other inner face of the valve box 7 so that the horizontally extending passage 21 in the hub 19 connects the in-take valve chamber 8 with the right filter chamber 5, and the horizontally extending passage 22 connects the in-take valve chamber 8 with the left filter chamber 6. A hub 23 joins the right cylinder 3 with one of the inner faces of the valve box 9, and the hub 24 joins the left cylinder 4 with the other inner face of the valve box 9 so that the horizontally extending passage 25 connects the outlet valve chamber 10 with the right filter chamber 5, and the horizontally extending passage 26 connects the outlet valve chamber 10 with the left filter chamber 6. The in-take and discharge bosses and their flanges and the hubs between the valve boxes and cylinders are preferably of standard pipe dimensions of the pipe in the line with which the apparatus is to be used.

In the valve chamber end of each passage between the valve chambers and the filter chambers is a cylindrical bore 29, and removably set in each of these bores is a cylindrical valve seat bushing 28. Arranged to seat against these bushings and close the passages are disk valves 27. The inside diameters of the seat bushings 28 are desirably at least equal to the diameters of the in-take and discharge passages 17 and 18, while the outside diameters of the seat bushings 28 and the valves 27 are necessarily some larger in diameter so that they cannot pass through the openings 17 and 18. The vertical walls 30 of the valve chambers in which the seat bushings are set are preferably at right angles to the axis of the passages through them, and their horizontal width is greater than the outside diameters of the seat bushings 28 and valves 27. The full triangular cross section of each valve chamber 8 and 10 extends to the top of the valve chambers, which tops are closed by similarly shaped domed covers 31 which have external flanges 32 that are detachably secured by bolts 33 to the external flanges 34 at the upper end of the valve boxes. This construction furnishes means whereby the seat bushings 28 and valves 27 may be inserted through the open tops of the valve chambers when the covers are removed, and it also permits the introduction of the tools for boring, reaming, facing and adjusting the valve seating parts. The angles of the cylindrical bushing bores 29 to the planes of the in-take and discharge openings 17 and 18 are such that the axes of the bores pass substantially through the centers of the openings 17 and 18, whereby the valve seats are so presented toward the openings as to permit the use of the boring bar of large diameter or other type boring device in forming the bores by reaching through the openings.

The open upper ends of the filter chambers 5 and 6 are normally closed by circular dome shaped tank covers 35. Annular packing gaskets 36 are seated in annular recesses 37 in the bottom faces of said covers and bear upon the internal flanges 38 about the tops of the filter tanks. The tank covers 35 are held in position by central vertically extending tie-rods 39 which have nuts 40 at their upper ends and nuts 65 at their lower ends.

In the preferred construction in the ordinary sizes of apparatus the vertical filter tanks 3 and 4, the vertical valve boxes 7 and 9 with the hubs 19, 20, 23, 24, and the bosses 11 and 12 with the flanges 15 and 16 are formed as an integral casting, leaving a central space 400 which is useful in venting the mold in which the casting is made and relieving the shrinkage stresses at the time of casting the body.

Vertical lugs 41, integral with the body, extend into this space 400 for supporting a swinging crane. This crane comprises a fixed tubular column 42, extending through which is a rotary post 43. The post carries a horizontally swinging arm 44 with a traversing trolley 45 having an eye-ring 46 for the suspension of a tackle adapted to lift and move the tank covers 35 which are provided with eye-bolts 47 to admit of this and for handling the strainer elements, valve box covers, valves and other heavy parts.

In each filter chamber 5 and 6 there is a removable strainer element 48 comprising a substantially cylindrical vertically arranged outer basket 49 and a shorter and smaller basket 50 that is removably supported therein. The outer basket 49 and inner basket 50 have their curved walls and bottoms made of perforated sheet metal or woven wire mesh and they form a clear liquid space 51 between their respective sides and bottoms. The outer basket 49 has an internal flange 52 at its top, and the inner basket 50 has a spider 54, the outer rim 53 of which rests upon the flange 52 so that the top of the substantially annular clear liquid space 51 between the baskets is normally closed.

The inner baskets 50 and the outer baskets 49 are desirably located eccentric with relation to each other and to the filter chambers in which they are placed, their diameters, lengths and centers being so arranged as to correctly proportion the cross sectional areas of the clear liquid space 51 to the requirements of flow through the apparatus while furnishing the largest possible accumulative space for strained out materials on the outer or intake side of the straining surfaces and ample section for flow to them.

A delivery opening or mouth 55 in the curved wall of the outer basket 49 communicates from the clear liquid space 51 between the baskets to the outlet passage 25 or 26. The rim of this curved mouth lies in close contact with a slightly raised annular finishing pad 56, formed on the wall of the cylinder about the outlet passage.

The outer basket 49 has a bottom frame or spider 57 which has an eccentric hub 58 secured to a vertical tube 59 which passes loosely through and supports the top spider 54 of the inner basket. The tube 59 carrying the strainer elements has a set-lining 60 formed with a tapered bore 61 and integral radial projections 62 extending into the radial pockets 63 in the inner wall of the tube 59 to secure it thereto. An eccentric tapered collar 64 on the tie-rod 39 loosely fits into the tapered bore 61, thereby removably supporting the strainer elements in their set positions against the wall of the strainer chamber. A stop 651 on the wall of the chamber registers the delivery mouth of the strainer element with the end of the outlet passage.

The eccentric angle and position of the collar 64 are such that the strainer element may be lifted straight out of the tank, clear of the internal flange 38 by slightly lifting it off of the collar 64 and turning it about half way around.

The tube 59 carrying the strainer element is supported at its upper end by an adjustable slide-and-clamp socket 66 which is set to place on and then bolted and doweled to the under side of the tank cover 35 which is angularly located by a dowel pin 67.

Stay studs 68 between the bottoms of the filter baskets 49 and 50 reinforce those bottoms against collapsing. Each stud 68 has an end stem 69 riveted through the bottom of the basket 49 to hold the stud in place.

Each tank cover 35 has a centralizing lip 70 loosely fitting inside the flanges 38, and each tie-rod 39 has a lower eccentric flange 73 engaging the dowel pin 74 fixed to the bottom of the tank to hold the tie-rod in angular position.

At the bottom of each filter tank there is a large wash-out valve 75 adapted to be connected to a waste pipe 76. This means is adapted to be used for washing out accumulations of the strained material from the filter chambers. The top faces of the tanks and valve boxes and the central lugs 41 are preferably all on the same plane, to permit cheap surfacing of these parts by a single operation in a common machine tool.

Each valve 27 is removably coupled to a vertical stem 77, preferably by a tapered pin 78 fastened through the valve into an oblong hole 72 in the stem. This pin has a hole 79 drilled and tapped at its larger end for the insertion of a drawing out means, and it is inserted from the front face of the valve through a reinforcing boss 80, being normally held in place by a split cotter pin 81 that passes transversely through the pin 78 and boss 80 and has its spread ends lying in transverse circular recesses 82 milled through opposite walls of the boss 80.

When the descending valve 27 reaches its lowest closed position it is forced against the seat bushing 28 by means of the inclined surface 83 on the end of the stem 77 with the fixed inclined surface 84 formed on a thrust projection 85 that is preferably electrically welded to a rectangular vertical guide bar 86. This guide bar is removably held in place by upper and lower set-linings 87 and 88 located in upper and lower bar sockets 89 and 90 that are preferably integral with the covers 31 and bottom of the body, respectively. These set-linings are preferably formed by pouring Babbitt metal or other readily fusible material into the sockets after the guide bars have been placed in position and held by clamping them to their respective valves with the valves located in their closed positions against the seat bushings. The set-linings 88 are retained in place by their molded projections 91 extending into pockets 92 of the roughened walls of the socket 90.

For the purpose of adjusting the pressure of the valves against the seats after wear on reseating, central thrust screws 93 are adjustably secured through the central bosses 80 to the front faces of the valves against the flat faces of the stem 77. After adjustment of each valve by means of the thrust screw a tapered expansion plug 94 is screwed tightly into the tapered threaded hole 95 in the end of the thrust screw to expand and tightly lock the screw against accidental loosening. Two cross slots 96 are made in the end of each screw 93 and a square wrench socket 97 in the end of the plug 94 to receive a suitable screw driver and wrench for turning and holding the parts for locking. For these operations the parts are accessible through the filter chamber and branch passages when the valves are closed.

Each valve 27 has a supporting saddle 98 by which it is attached to, but is free to slide on the guide bar 86. This saddle is preferably in one piece, passing around the bar 86, and is removably bolted to the back of the valve on which it is held in position by suitable doweling means, preferably by a circular counter-bore 99. A clearance space 100 between the saddle 98 and the guide bar 86 permits of the suitable adjustment of the valve 27 after wear or reseating. In one form of apparatus illustrated, each valve 27 is operated by a tooth-pinion 101 engaging a tooth-rack 102 at the top of and preferably integral with the valve stem 77. The pinion 101 preferably has an integral shaft 103 which is journaled in the top of a stand 104 removably secured to the valve box cover 31 and having a stuffing-box and a gland in its base through which the valve stem 77 passes. The base of the stand 104 projects through and below the cover 31 in a cylindrical extension 107 which engages a seat or recess 108 in the end of the guide bar 86 to hold it back into its set lining 87, which stand hold or socket 109 is located by a jig in manufacture. The shafts 103 are joined together by adjustable couplings 110, to insure simultaneous seating of both the valves operated by the same coupled pairs of shafts, the coupling comprising a circular flange member 111, keyed to one shaft 103, a two-armed coupling member 112, keyed to the other shaft 103, and a drive disk 113 seated in a counter bore 114 in the face of the flange 111. These parts are adjustably clamped together in any angular relation by bolts 115 in either of the several circumferentially spaced holes 116 through the flange of member 111 and through circumferentially elongated holes 117 in the disk 113. The member 112 carries longitudinally extending drive pins 118 engaging circumferentially located holes 119. By this means two valves 27 which are controlled by the same coupled pair of shafts 103 may be seated simultaneously but unseated one ahead of the other. The end of the shaft 103 is rotatably supported in a central hole 120 in disk 113. Keyed to one shaft 103 of each coupled pair is a hand wheel 121, attached to which is a ratchet wheel 122. This ratchet wheel is engaged by a pawl 123 on an arbor 124 that has a knurled handle 125 and is supported on the stand 104 which is mounted on the top of the valve box cover 31. By turning this handle the pawl 123 can be thrown into or out of engagement with the ratchet wheel when the valves are being operated. Each valve stem 77 has an eye-bolt 126 for the attachment of a counter-balance cable, if desired to counterbalance the weight of large valves.

Figure 1:
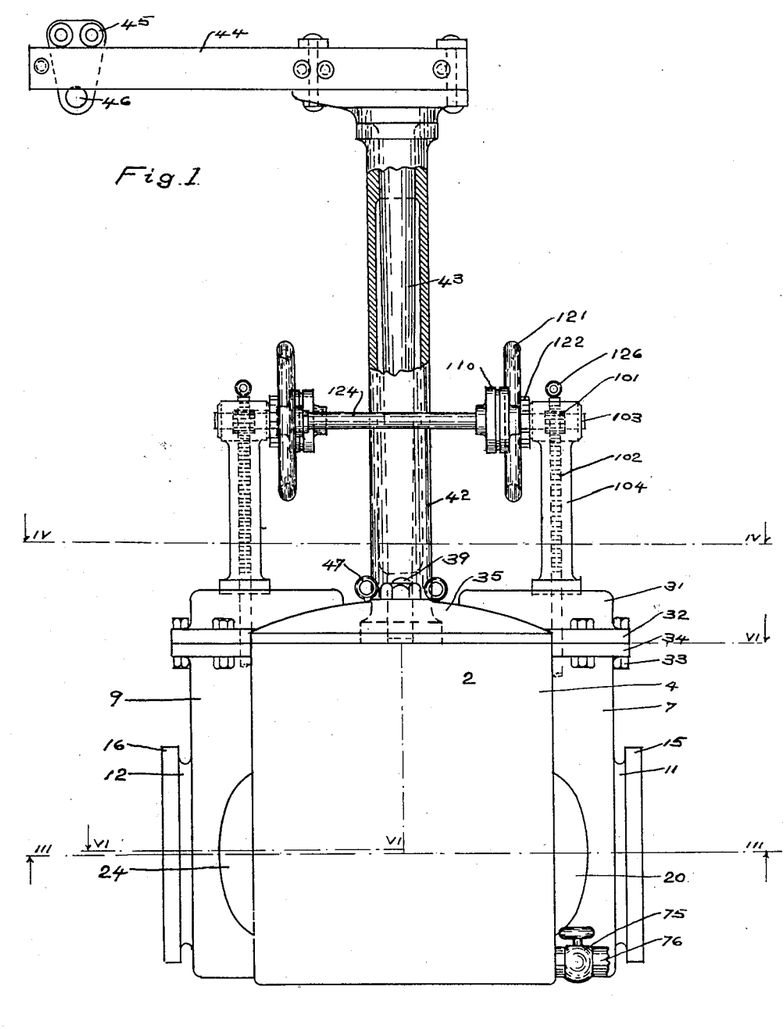
Figure 1 shows a side elevation of a form of such an apparatus which embodies the invention.
Figure 2:
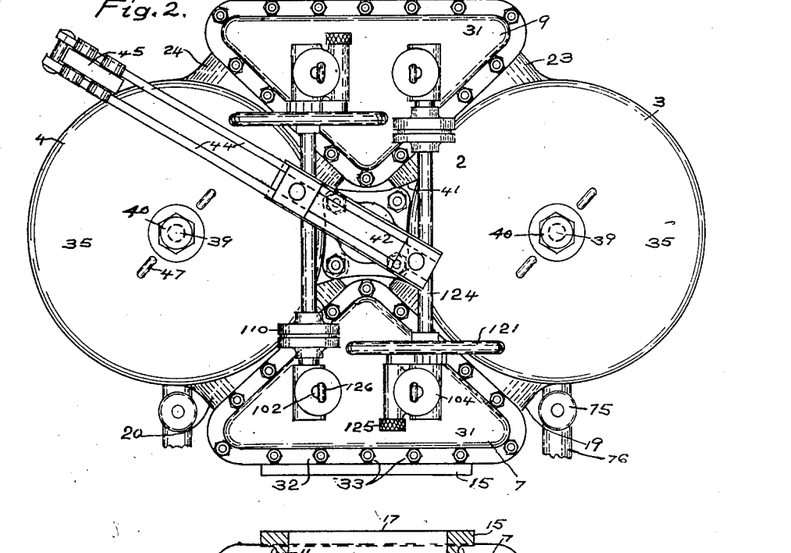
Fig. 2 shows a plan of the same with the crane arm swung to a different position.
Figure 3:
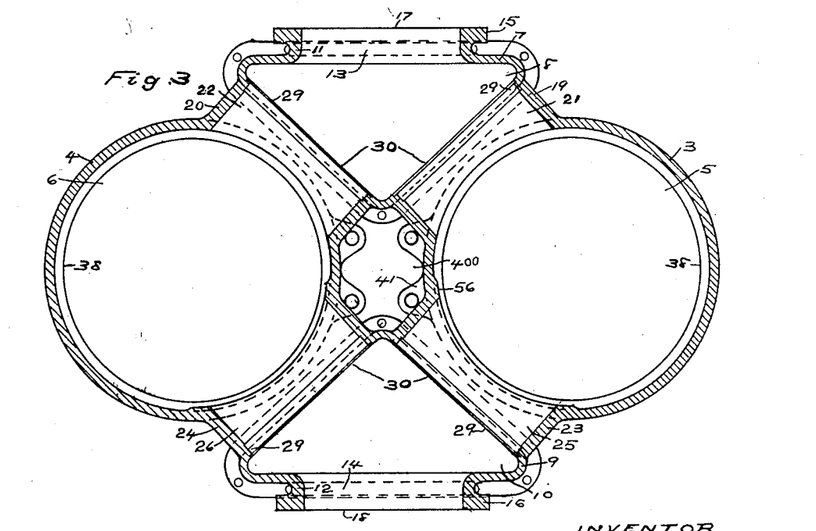
Fig. 3 is a horizontal section of the casing on the plane indicated by the dotted line III—III of Fig. 1 and looking upward.
Figure 4:
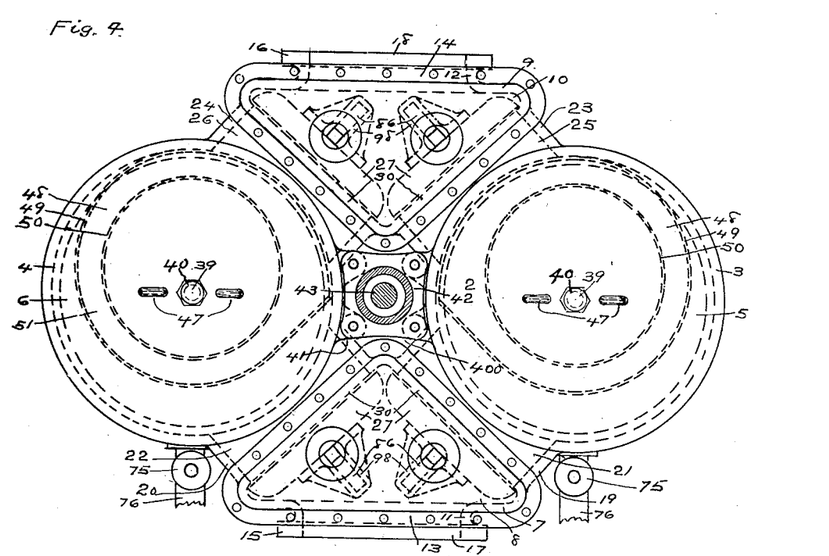
Fig. 4 shows a plan of the apparatus looking downward from the plane indicated by the dotted line IV—IV on Fig. 1 with the valve operating means and the crane cut away.
Figure 5:
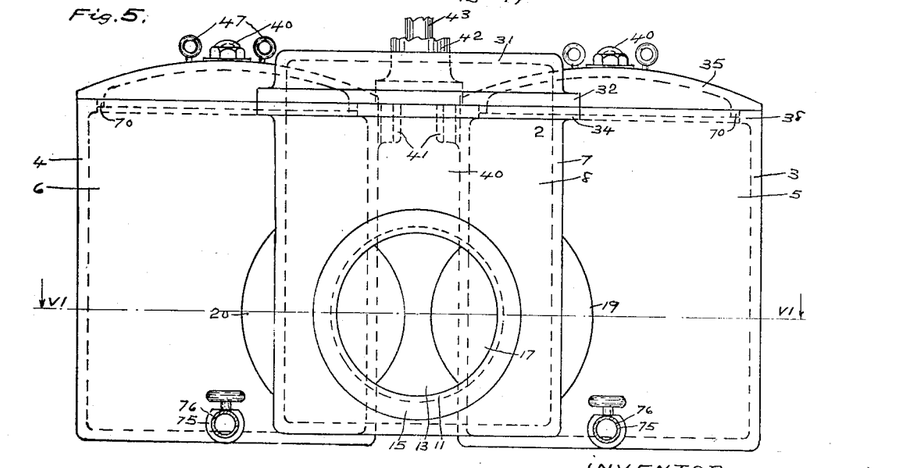
Fig. 5 shows a front elevation with the crane and valve mechanism omitted.
Figure 6:
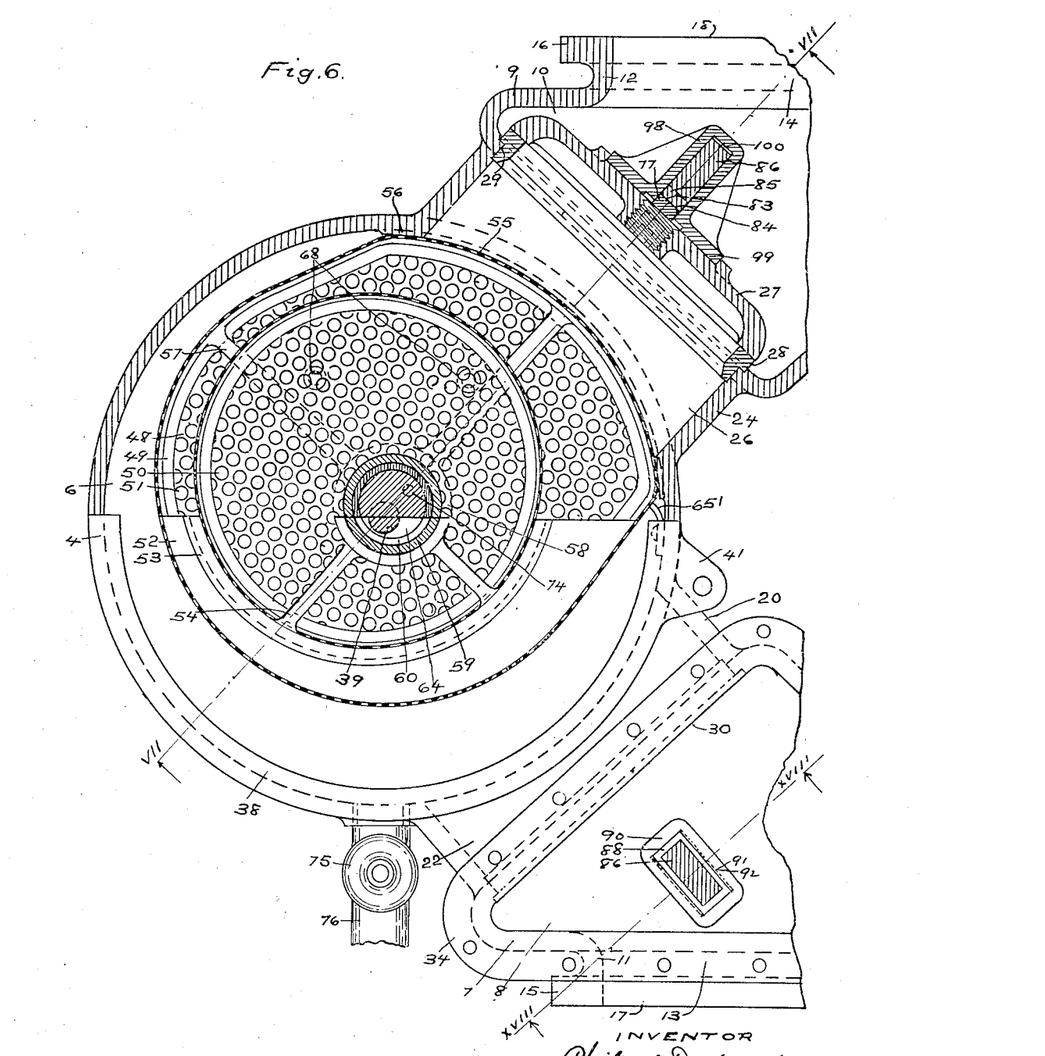
Fig. 6 on larger scale shows a horizontal section of a part of the apparatus taken on the dotted line VI—VI of Fig. 1.
Figure 7:
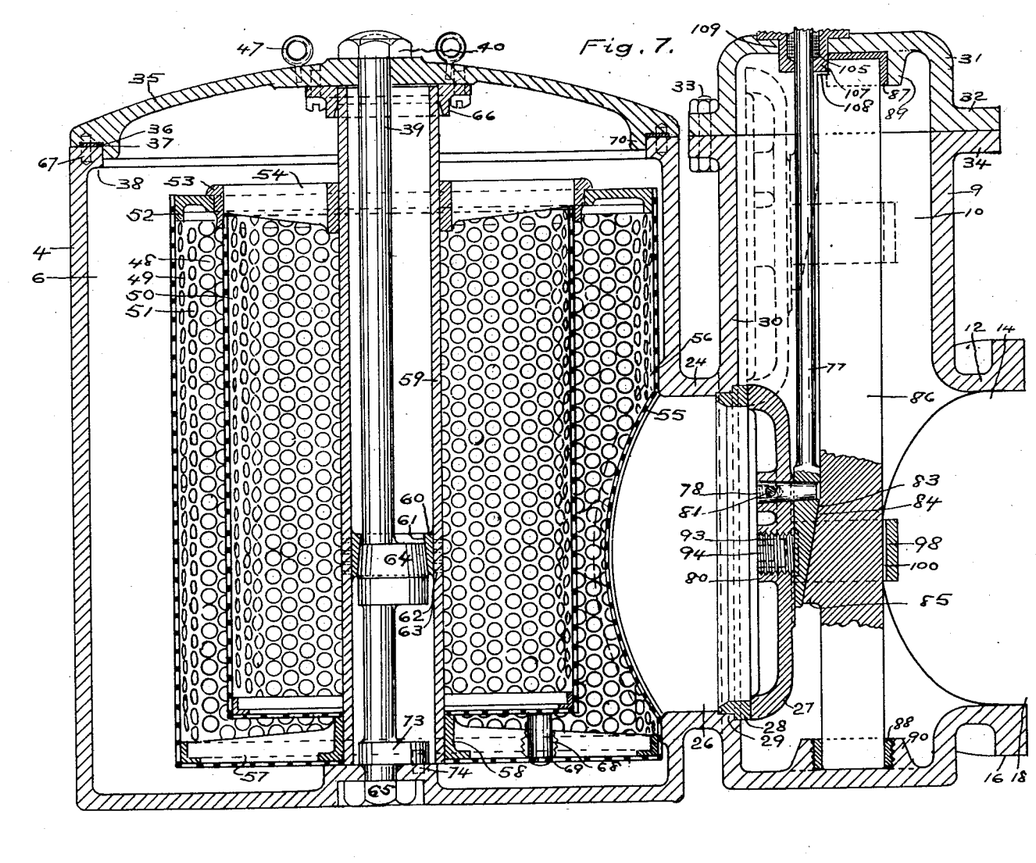
Fig. 7 is a vertical section taken on the plane indicated by the line VII—VII on Fig. 6.
Figure 8:
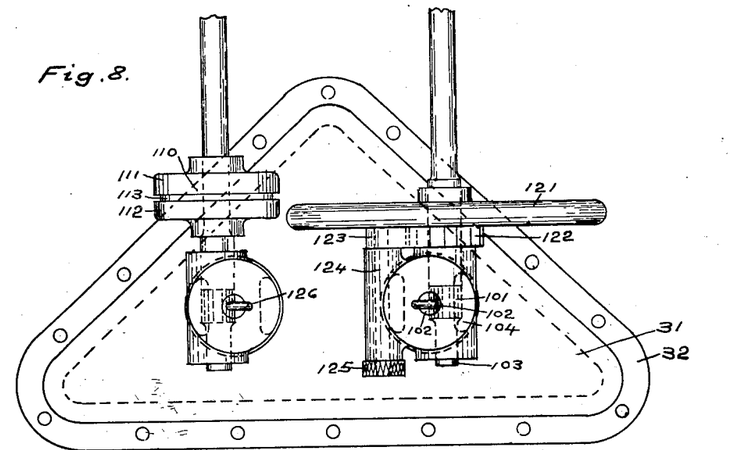
Fig. 8 shows a plan of one valve box.
Figure 9:
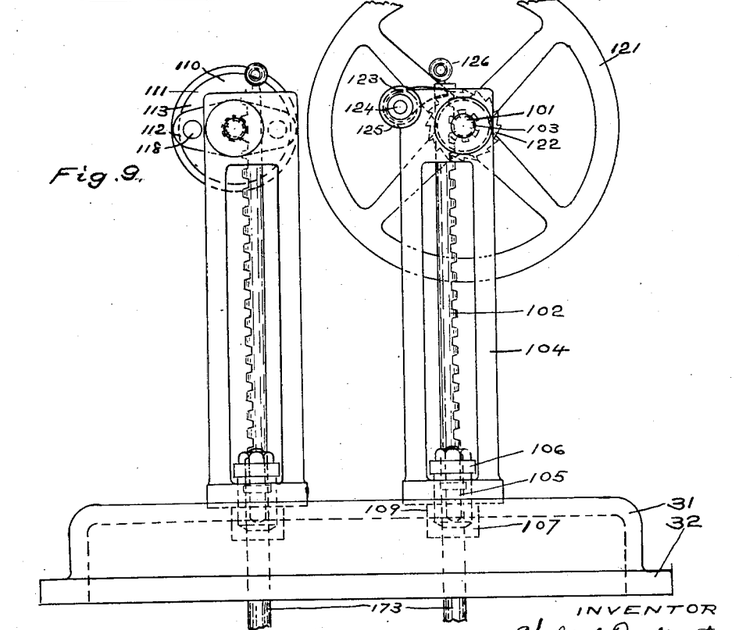
Fig. 9 shows a front elevation of the parts shown in Fig. 8.
Figure 10:
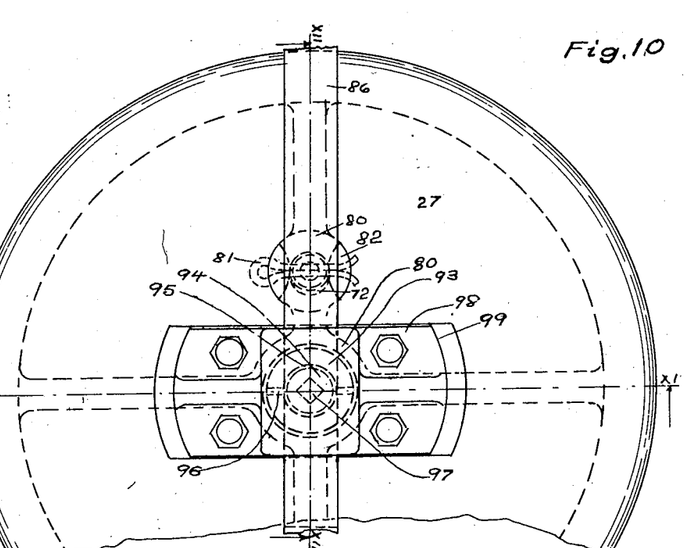
Fig. 10 shows an elevation of one of the valves and its guide bar.
Figure 11:
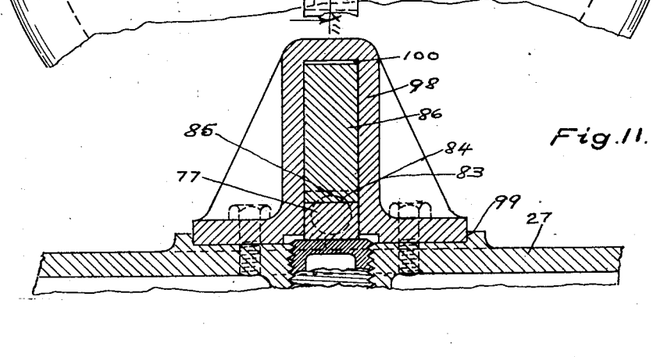
Fig. 11 shows a horizontal section taken on the plane indicated by the dotted line XI—XI on Fig. 10.
Figure 12:
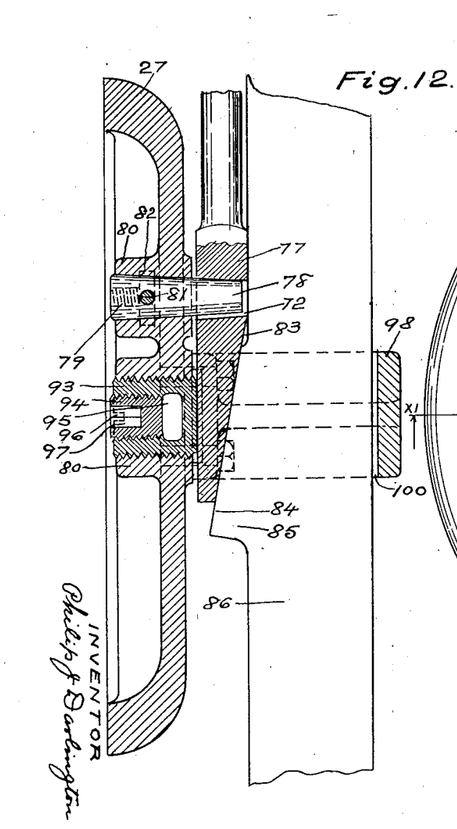
Fig. 12 is a vertical section taken on the plane indicated by the dotted line XII—XII on Fig. 10.
Figure 13:
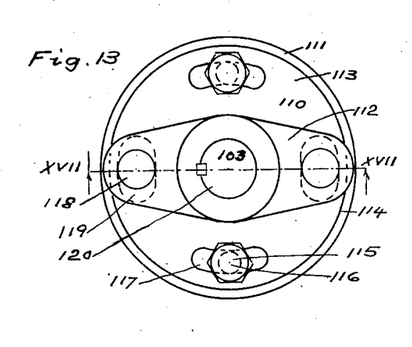
Fig. 13 shows a front elevation of a coupling of the valve operating means.
Figure 14:
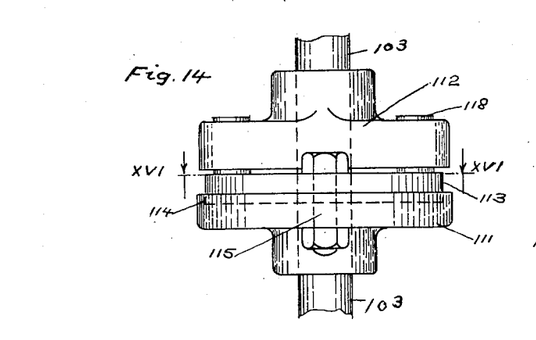
Fig. 14 shows a plan of the same.
Figure 15:
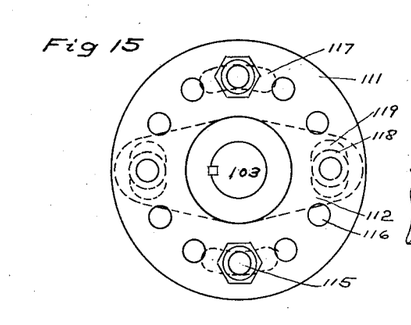
Fig. 15 shows a rear elevation of the coupling.
Figures 16, 17:
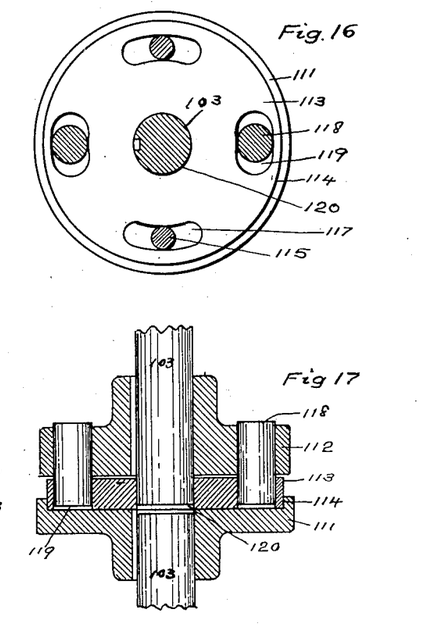
Fig. 16 is a section on the plane indicated by the line XVI—XVI on Fig. 14.
Fig. 17 is a section of the same on the line XVII—XVII on Fig. 13.
Figure 18:
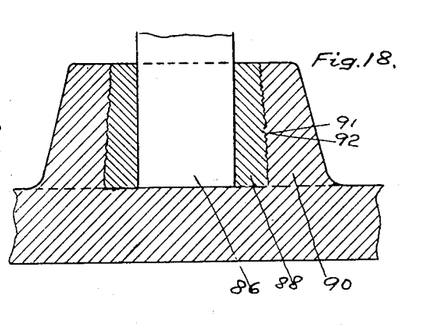
Fig. 18 is, on enlarged scale, a sectional elevation taken on the line XVIII—XVIII of Fig. 6.
Figure 19:
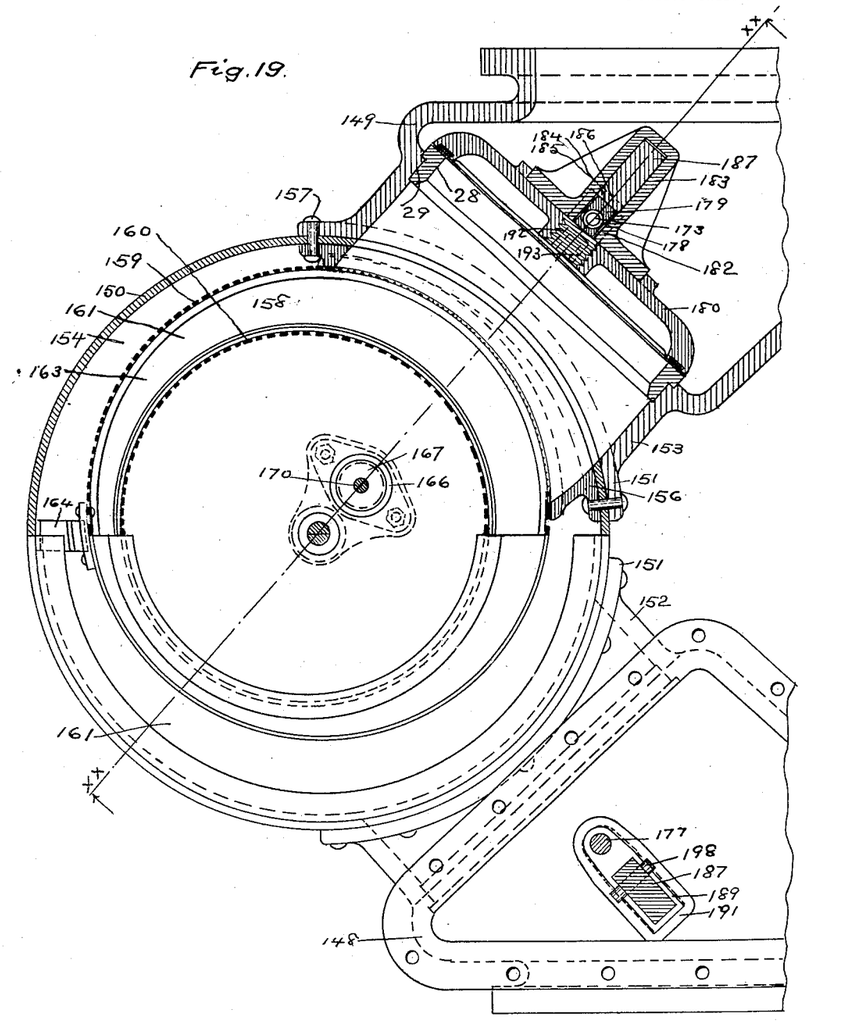
Fig. 19 shows partly in plan and partly in horizontal section a modified form of the invention.
Figure 20:
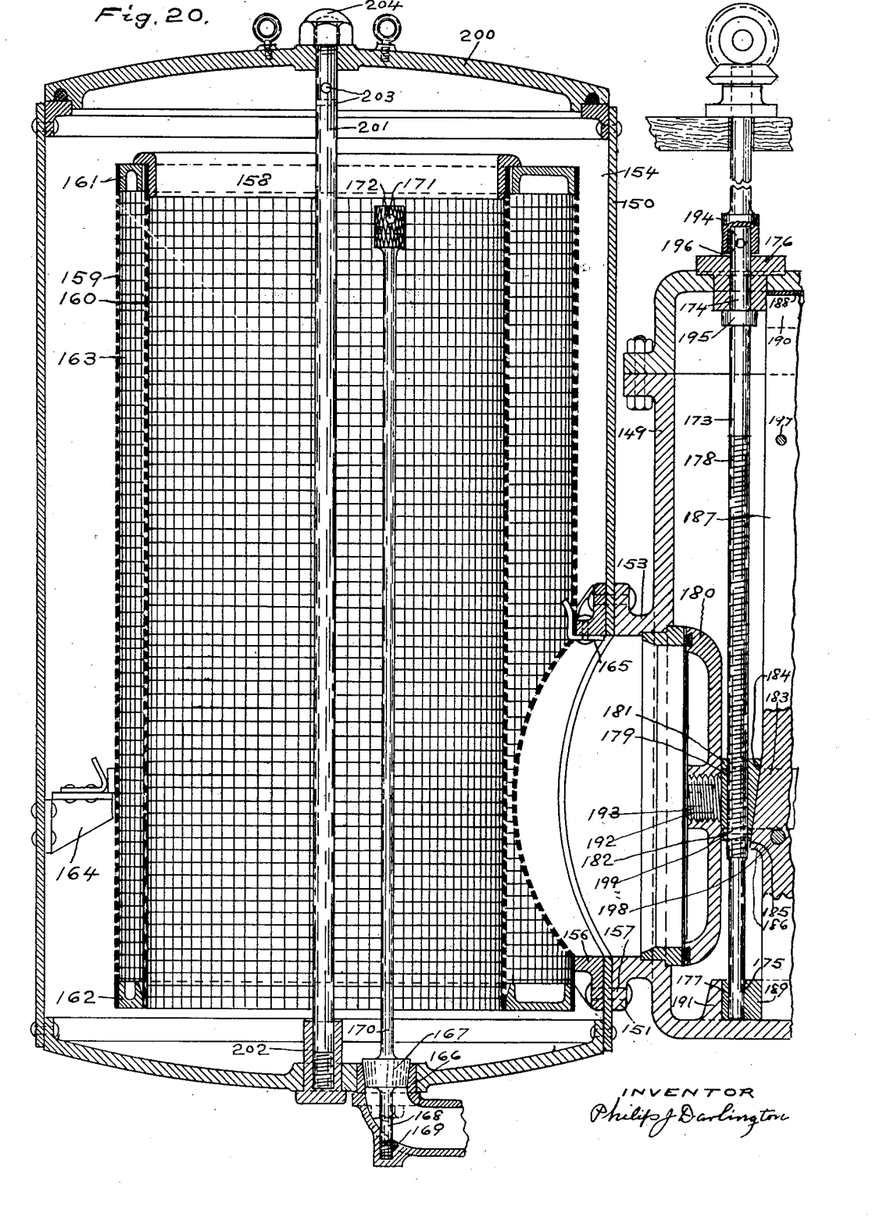
Fig. 20 is a vertical section of the apparatus shown in Fig. 19 taken on the plane indicated by the dotted line XX—XX on Fig. 19.

In the form of apparatus shown in Figs. 19 and 20 which is a modification of the invention especially suited to very large sizes and the use where the filtering mesh must be a fine woven fabric which could not be supported in flat areas or where rack and pinion stands might project objectionably, the filter tanks 150 are formed of steel boiler plate and riveted to cast iron flanges 151 on the hubs 152 and 153 which extend between the filter tanks and valve boxes. In this form around each outlet is a flanged tubular extension 156 which is fastened by rivets 157 through the flange and shell of the filter and through the flange of the outlet hub.

The strainer element 158 of this modified form comprises an outer cylindrical basket 159 and an inner cylindrical basket 160, which inner basket is open at top and bottom. Annular top and bottom rings 161 and 162 close the annular clear liquid space 163 between these cylindrical baskets. Wall brackets 164 and mouth brackets 165 are riveted to the walls of the tank 150 and extension flange 156, respectively, to support the strainer element 158.

The wash-out valve 166, which is quite large, is attached to the bottom of the tank near the center and is normally closed by a taper plug 167 inserted from the inside of the filter chamber 154 and normally held seated by a downwardly projecting stem 168 that screws into the valve frame socket 169. The plug 167 has a long vertical operating rod 170 extending upward through the strainer element and terminating in a knurled handle 171 with cross holds 172 for turning and lifting out the plug so as to open the wash-out valve when desired.

In this modification the valve stem 173 has a journal 174 at its upper end that is supported by a box 176, and has a journal 175 at its lower end extending into a lining 177 at the bottom. This valve stem has a screw thread 178, along which a nut 179 travels and carries the valve 180 by means of overhanging flanges 181 and 182 engaging a saddle 183, as the stem 173 is turned and moves the nut 179.

The nut 179 has an inclined surface 184 which engages a coöperating inclined surface 185 on the thrust projection 186 of a guide bar 187 held in the set-linings 188 and 189 in bar sockets 190 and 191, and by box 176 in the cover.

An adjustable thrust screw 192 is screwed through the valve 180 against the straight face of the nut 179 and is locked in place by an expansion plug 193 which is screwed into it. The upward and downward thrust of the valve stem 173 is met by outer and inner collars 194 and 195 which are so spaced as to leave a clearance 196 either above or below the stand 176, which by its presence above stand 176 indicates whether the stem 173 is thrust upward or downward, and is an effective tell-tale as to whether the valve is closed against its seat or opened against the upper stop pin 197 in the bar 187. A lower stop pin 198 engages the saddle 183 when the valve is in its lowest closed position. The nut 179 may then move a further distance equal to the flange clearance 199 to force the valve tightly onto its seat without sliding it thereon.

The tank covers 200 are removably secured in place by tie-rods 201 which at their lower ends screw into nuts 202 and at their upper ends are provided outside of the covers with nuts 204. Cross holes 203 are provided for the insertion of pins so that the tie-rods may be unscrewed and lifted out of the tank.

When this apparatus is in normal operation, all of the valves are open and the liquid to be treated enters through the in-take opening into the inlet valve box and divides and flows through the two inlet branch passages to the filter chambers where it passes through the strainer or filter mesh. The cleaned liquid then flows through the two outlet branch passages into the outlet valve box where the streams unite into one and leave by the discharge opening. When it becomes necessary to clean or recharge a filter chamber the two valves controlling the branch passages to that chamber are closed. Then the cover may be removed from the filter chamber and the cleaning or recharging completed, after which the chamber is closed and the valves opened.

The invention claimed is:—

1. In a duplicate strainer two parallel cylindrical filter tanks and two parallel triangular branch boxes, with the apices of said branch boxes extending into the spaces between the circumferences of the cylindrical filter tanks and each branch box communicating with both of the filter tanks.

2. In a duplicate strainer, two vertical cylinder filter tanks with removable top covers, two vertical triangular branch boxes with triangular removable top covers, said branch boxes being located between the filter tanks, branch passages connecting each tank with each box, valves in said boxes controlling said passages, said valves being removable through the tops of said boxes when said covers are removed.

3. In a duplicate strainer, two parallel cylindrical filter tanks, two parallel three-way triangular branch boxes parallel therewith and extending between the filter tanks, four branch connections in a plane transverse thereto, said tanks, boxes and connections surrounding an open central space between said tanks and said boxes.

4. In a duplicate strainer, two parallel filter tanks, two parallel three-way branch boxes parallel therewith, four branch connections in a transverse plane thereto and around an open central space between said tanks and boxes and means projecting into said space adapted for the attachment of hoisting means.

5. The combination in a straining apparatus having a closed tank with valve controlled inlet and outlet openings of a strainer element comprising two perforated circular walls, one inside of the other, interposed in the path of liquid through the apparatus, the annular space between said perforated walls being without opening into it except through the perforations of both perforated circular walls, but having an unrestricted opening out of it near one end of one wall, whereby liquid will flow into the annular space through the perforated walls in several directions and flow out of the annular space through the unrestricted opening at one locality and in one direction only.

6. The combination in a straining apparatus having a closed tank with valve controlled inlet and outlet openings of a straining element having two perforated walls arranged to form an annular space between them, and means for directing the flow of the liquid in opposite directions through opposed areas of the said two walls.

7. The combination in a straining apparatus having a closed tank with valve controlled inlet and outlet openings of a straining basket formed of two circular walls, one inside the other, said basket being open at one end for the free flow of water to the central space and open at the other end for the free flow of water from the annular space between said walls.

8. In a strainer, a chamber having an inlet opening and an outlet opening, a strainer member within said chamber comprising an outer straining cylinder with perforated walls, an inner straining cylinder therein of smaller diameter and also having perforated walls, and closure means whereby the annular space between said cylinders is open to the said outlet opening only and the said inner cylinder is open to said inlet opening only.

9. The combination in a straining apparatus having a closed tank with valve controlled inlet and outlet openings of a straining member comprising an outer basket having its walls and bottom of strainer mesh and a removable inner basket shorter and of smaller diameter than said outer basket and also having its walls and bottom of strainer mesh, an annular member closing the space between said baskets at one end and the outer basket having an opening at one side.

10. The combination in a straining apparatus having a closed tank with valve controlled inlet and outlet openings of a straining element comprising an outer straining basket having perforated walls, an inner straining basket of smaller diameter and also having perforated walls, an annular space between the perforated walls of said outer and inner baskets, said annular space being opened near one end and said inner basket having an opening from the other end.

11. In a strainer, a chamber having two openings for liquid passage, a strainer member within said chamber comprising an outer straining cylinder, an inner straining cylinder of smaller diameter with an annular space between said cylinders, and closure means whereby said annular space is open to one only of said liquid passages and said inner cylinder is open to the other of said liquid passages.

12. The combination in a straining apparatus having a closed tank with valve controlled inlet and outlet openings, of a straining element comprising an outer basket, an inner basket that is smaller in diameter than said outer basket, and providing therewith a liquid space between the walls of said baskets, and means for directing the flow of liquid in opposite directions through opposed areas of said walls to the space between said walls.

13. In a strainer, a straining element comprising a cylindrical outer member and a smaller cylindrical inner member within said outer member forming an annular space between said members, said members being eccentric to each other with the wide portion of the annular space next to the outlet and thus providing for increasing the volume of flowing liquid toward the outlet in said annular space.

14. In a strainer, a chamber with its upper end closed by a removable cover, fluid passages to and from said chamber, a strainer basket removable through the upper end of said chamber and having a mouth open to and pressed against the rim of one of said passages, and adjustable means securing said basket in its normal position in said chamber.

15. In a strainer, a cylindrical chamber with a removable cover normally held in place by a central tie-rod, a removable strainer element in said chamber and eccentric means on said tie-rod for adjusting and removably securing said strainer element in its required position in said chamber.

16. In a strainer, a cylindrical chamber with a removable cover normally held in place by a central tie-rod, a removable strainer element in said chamber and adjustable tapered means on said tie-rod for removably securing said strainer element in its required position in said chamber.

17. In a strainer, a chamber with its top closed by a removable cover, a strainer element in said chamber, an opening in the wall of said chamber, an adjustable socket on the under side of said cover engaging a part of said strainer element to hold it in position relative to said opening, and means for clamping said socket to said cover in a set position.

18. In a strainer, a cylindrical chamber, a strainer element located eccentrically in said chamber, and eccentric means engaging said strainer element for locating it in or permitting its removal from desired position.

19. An apparatus for straining or filtering liquids comprising a pair of cylinders arranged vertically side by side, an inlet valve box on one side intermediate of and communicating with the cylinders, an outlet valve box on the other side intermediate of and communicating with the cylinders, a strainer comprising an inner perforated wall and an outer perforated wall spaced apart and located in each cylinder with the space between said perforated walls communicating with the opening to one valve box and the space outside of said outer perforated wall communicating with the opening to the other valve box, two independent valves located in the inlet valve box, two independent valves located in the outlet valve box, and means for coöperatively opening and closing a valve in the inlet valve box and a valve in the outlet valve box.

PHILIP J. DARLINGTON.